(12) United States Patent
Shintani et al.

(10) Patent No.: US 10,900,201 B2
(45) Date of Patent: Jan. 26, 2021

(54) DISPLAY SYSTEM OF WORKING MACHINE AND WORKING MACHINE

(71) Applicant: Komatsu Ltd., Tokyo (JP)

(72) Inventors: Satoru Shintani, Tokyo (JP); Yoshito Kumakura, Tokyo (JP); Daiki Arimatsu, Tokyo (JP)

(73) Assignee: KOMATSU LTD., Tokyo (JP)

( * ) Notice: Subject to any disclaimer, the term of this patent is extended or adjusted under 35 U.S.C. 154(b) by 173 days.

(21) Appl. No.: 15/521,969

(22) PCT Filed: Sep. 30, 2016

(86) PCT No.: PCT/JP2016/079163
§ 371 (c)(1),
(2) Date: Apr. 26, 2017

(87) PCT Pub. No.: WO2017/047826
PCT Pub. Date: Mar. 23, 2017

(65) Prior Publication Data
US 2018/0094408 A1    Apr. 5, 2018

(51) Int. Cl.
*E02F 9/26* (2006.01)
*G01C 9/06* (2006.01)
(Continued)

(52) U.S. Cl.
CPC .............. *E02F 9/26* (2013.01); *E02F 9/264* (2013.01); *G01C 9/04* (2013.01); *G01C 9/06* (2013.01);
(Continued)

(58) Field of Classification Search
CPC ... E02F 9/264; E02F 9/26; H04N 7/18; H04N 7/181–188; G01C 9/04; G01C 9/06
See application file for complete search history.

(56) References Cited

U.S. PATENT DOCUMENTS 6,526,668 B1    3/2003    Beckhart et al.
7,228,505 B2    6/2007    Shimazu et al.
(Continued)

FOREIGN PATENT DOCUMENTS

CN    1337504 A    2/2002
CN    1705801 A    12/2005
(Continued)

OTHER PUBLICATIONS

International Search Report dated Dec. 13, 2016, issued for PCT/JP2016/079163.

*Primary Examiner* — Mark K Zimmerman
*Assistant Examiner* — Jonathan M Cofino
(74) *Attorney, Agent, or Firm* — Locke Lord LLP

(57) ABSTRACT

A display system of a working machine includes: a tilt sensor that detects a pitch angle and a roll angle of a working machine; a calculation unit that calculates a tilting position on polar coordinates that indicates a magnitude and a direction of tilt of the working machine based on the detected pitch angle and roll angle; a display unit that displays various kinds of information; a display processing unit that displays, on a predetermined region on a display screen of the display unit, a monitor-displayed level that performs a polar coordinate display of the tilting position and a marked line indicating a preset magnitude of tilt; and a setting processing unit that performs a setting to change display content of the monitor-displayed level.

12 Claims, 14 Drawing Sheets

(51) Int. Cl.
  *G01C 9/04* (2006.01)
  *E02F 3/32* (2006.01)
  *E02F 9/20* (2006.01)
  *G06T 3/40* (2006.01)
  *G06T 3/60* (2006.01)
  *G06T 11/00* (2006.01)

(52) U.S. Cl.
  CPC . *E02F 3/32* (2013.01); *E02F 9/20* (2013.01); *E02F 9/205* (2013.01); *G06T 3/40* (2013.01); *G06T 3/60* (2013.01); *G06T 11/001* (2013.01); *G06T 2200/24* (2013.01)

(56) References Cited

U.S. PATENT DOCUMENTS

| | | | |
|---|---|---|---|
| 7,513,070 | B2 | 4/2009 | Ogura et al. |
| 8,151,207 | B2 | 4/2012 | Shimazu et al. |
| 9,494,423 | B2 | 11/2016 | Yamanoi et al. |
| 9,895,974 | B2 | 2/2018 | Watanabe et al. |
| 2002/0015062 | A1 | 2/2002 | Shimazu et al. |
| 2005/0192732 | A1* | 9/2005 | Narisawa ............... B66C 23/905 701/50 |
| 2005/0197756 | A1* | 9/2005 | Taylor .................... E02F 3/842 701/50 |
| 2006/0026101 | A1 | 2/2006 | Ogura et al. |
| 2007/0066363 | A1* | 3/2007 | Zhu ....................... G06F 3/0485 455/566 |
| 2007/0171087 | A1 | 7/2007 | Shimazu et al. |
| 2011/0178677 | A1 | 7/2011 | Finley et al. |
| 2012/0166137 | A1* | 6/2012 | Grasser ................ G01C 15/00 702/150 |
| 2012/0287277 | A1* | 11/2012 | Koehrsen ................ B60R 1/00 348/148 |
| 2014/0100712 | A1* | 4/2014 | Nomura ................. E02F 9/264 701/1 |
| 2014/0157402 | A1* | 6/2014 | Boss ...................... G06F 21/36 726/19 |
| 2015/0045059 | A1* | 2/2015 | Rudow ................. H04W 4/021 455/456.1 |
| 2015/0092187 | A1 | 4/2015 | Yamanoi et al. |
| 2015/0144582 | A1* | 5/2015 | Ford ....................... B66C 15/045 212/276 |
| 2015/0353329 | A1* | 12/2015 | Lin ......................... B66C 13/46 33/333 |
| 2015/0355337 | A1* | 12/2015 | Adair ....................... G01C 9/06 702/152 |
| 2016/0059700 | A1 | 3/2016 | Watanabe et al. |
| 2016/0097638 | A1* | 4/2016 | Fedigan .................. G01C 9/06 324/71.1 |
| 2016/0161944 | A1 | 6/2016 | Leonard |
| 2017/0175362 | A1 | 6/2017 | Iwanaga et al. |

FOREIGN PATENT DOCUMENTS

| | | |
|---|---|---|
| JP | 58-197193 A | 11/1983 |
| JP | 05-096985 A | 4/1993 |
| JP | 2001-039680 A | 2/2001 |
| JP | 2001-348914 A | 12/2001 |
| JP | 2004-309447 A | 11/2004 |
| JP | 2006219894 A | 8/2006 |
| JP | 2010-078439 A | 4/2010 |
| JP | 2015-227825 A | 12/2015 |
| JP | 2016-049868 A | 4/2016 |
| KR | 10-2016-0030465 A | 3/2016 |
| WO | 2011/090847 A1 | 7/2011 |
| WO | 2013/146419 A1 | 10/2013 |
| WO | 2015/030266 A1 | 3/2015 |

\* cited by examiner

DISPLAY SYSTEM OF WORKING MACHINE AND WORKING MACHINE

FIELD

The present invention relates to a display system of a working machine which displays a monitor-displayed level with which an operator of the working machine can recognize a tilt or a direction of the working machine with high accuracy if necessary, and a working machine.

BACKGROUND

In a working machine such as an excavator and a bulldozer, a bubble-tube level has been conventionally disposed to an operator's seat. When performing a leveling work of a scaffold with the working machine, an operator has recognized a tilting state of the working machine by referring to the bubble-tube level. However, since various kinds of display devices are arranged for the operator's seat, the bubble-tube level may be hidden by such display devices. In that case, the operator needs to change the operator's own attitude in order to recognize the tilting state of the working machine by the bubble-tube level, which deteriorates workability.

Patent Literature 1 describes a display device of a crane, a main body of the crane being disposed to a swinging body. The display device detects a tilting state of the main body of the crane and displays the tilting state on a display screen of the display device at an operator's seat on the swinging body. Patent Literature 2 describes an attitude recognition device which displays an attitude information-displaying image of a heavy machine based on a signal from a sensor attached to the heavy machine to detect longitudinal and lateral tilts with respect to a horizontal state of the heavy machine.

CITATION LIST

Patent Literature

Patent Literature 1: Japanese Laid-open Patent Publication No. 2001-39680
Patent Literature 2: Japanese Laid-open Patent Publication No. 2001-348914

SUMMARY

Technical Problem

Depending on content of work performed by a working machine, an operator needs to recognize a tilt and a direction of the working machine with high accuracy. In a conventional display device disposed to an operator's seat and displaying a tilt of a working machine, however, display content indicating a tilt and a direction of the working machine is fixed and therefore, there may be a case where it is difficult to recognize the tilt and the direction of the working machine with high accuracy and to perform sufficient support for the operator to recognize the tilt.

The present invention has been made in view of the above, and an object thereof is to provide a display system of a working machine which displays a monitor-displayed level with which an operator of the working machine can recognize a tilt or a direction of the working machine with high accuracy if necessary, and a working machine.

Solution to Problem

To resolve the above problem and attain the object, a display system of a working machine according to the present invention includes: a tilt sensor that detects a pitch angle and a roll angle of a working machine; a calculation unit that calculates a tilting position on polar coordinates that indicates a magnitude and a direction of tilt of the working machine based on the detected pitch angle and roll angle; a display unit that displays various kinds of information; a display processing unit that displays, on a predetermined region on a display screen of the display unit, a monitor-displayed level that performs a polar coordinate display of the tilting position and a marked line indicating a preset magnitude of tilt; and a setting processing unit that performs a setting to change display content of the monitor-displayed level.

In the display system of the working machine according to the above invention, the setting processing unit includes a marked line setting processing unit that performs a setting to change a magnitude of tilt indicated by the marked line.

In the display system of the working machine according to the above inventions, the setting processing unit includes a magnification setting processing unit that performs a setting to change a display magnification of the magnitude of tilt displayed on a screen of the polar coordinate display.

In the display system of the working machine according to the above inventions, the display processing unit changes a color of the screen of the polar coordinate display when the magnitude of tilt of the tilting position exceeds the marked line.

In the display system of the working machine according to the above invention, the setting processing unit includes a color change setting processing unit that performs a setting to change a color of the screen of the polar coordinate display.

In the display system of the working machine according to the above inventions, the tilting position is displayed as a bubble that is a circle with the tilting position as a center thereof on the screen of the polar coordinate display.

In the display system of the working machine according to the present invention, the tilt sensor is provided in the working machine, and at least one of the calculation unit, the display unit, the display processing unit, and the setting processing unit is provided outside the working machine.

A working machine according to the present invention includes the display system of a working machine according to any one of the above inventions.

According to the present invention, since a setting processing unit is included, an operator of a working machine can recognize a tilt or a direction of the working machine with high accuracy if necessary. Examples of the setting processing unit include a marked line setting processing unit which performs a setting to change a magnitude of tilt indicated by a marked line, and a magnification setting processing unit which performs a setting to change a display magnification of a magnitude of tilt to be displayed on a screen of a polar coordinate display.

DESCRIPTION OF EMBODIMENTS

Hereinafter, an embodiment of the present invention will be described with reference to the accompanying drawings.

<Overall Configuration of Working Machine>

Figure 1:
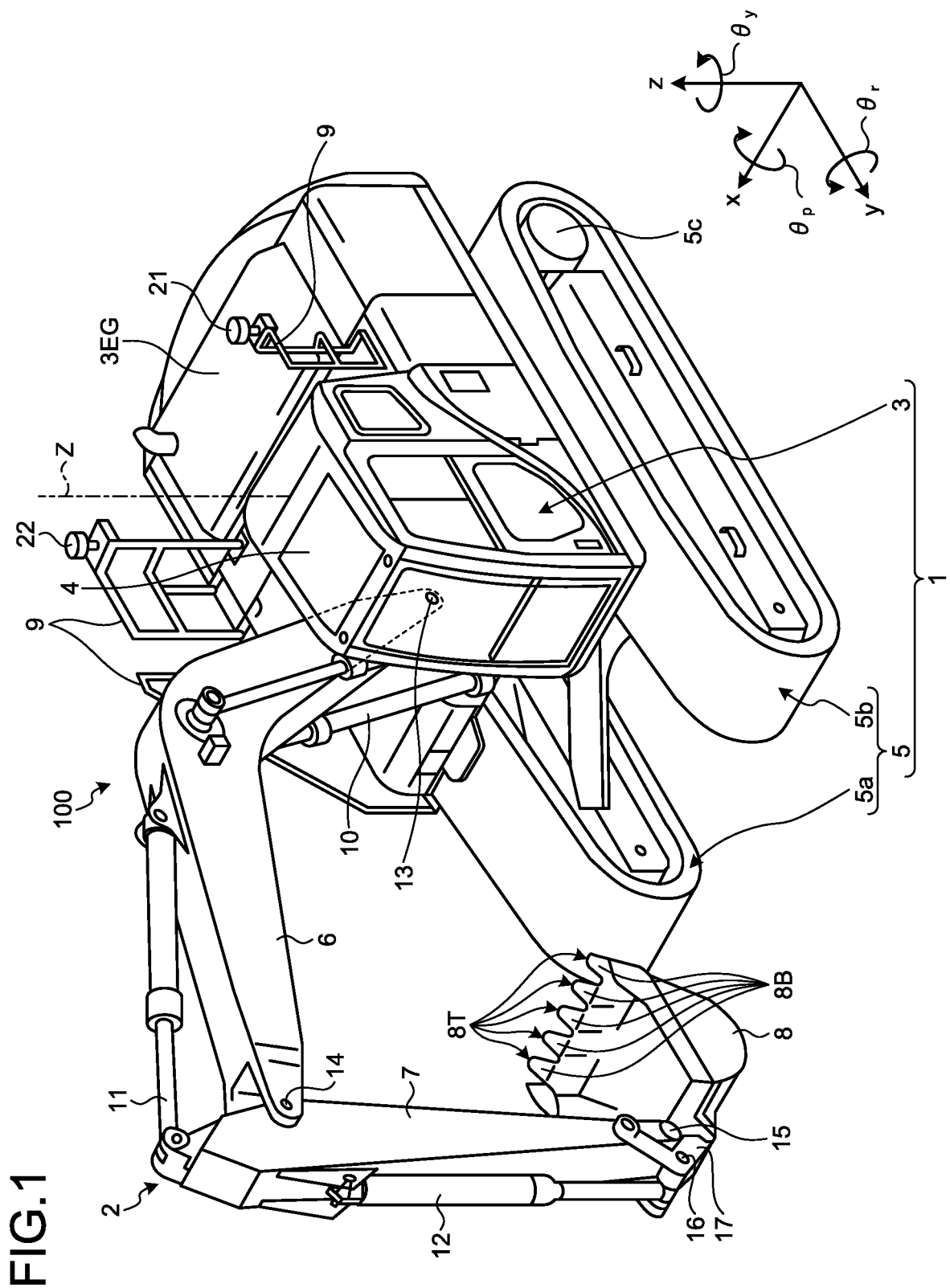
FIG. 1 is a perspective view of a working machine including a display system which displays a monitor-displayed level according to an embodiment.

FIG. 1 is a perspective view of a working machine including a display system which displays a monitor-displayed level according to the embodiment. An excavator 100 as an example of the working machine includes a vehicle main body 1 as a main body portion and a working implement 2. The vehicle main body 1 includes an upper swinging body 3 as a swinging body and a traveling device 5 as a traveling body. The upper swinging body 3 accommodates an engine and a device such as a hydraulic pump in a machine compartment 3EG.

Figure 2:
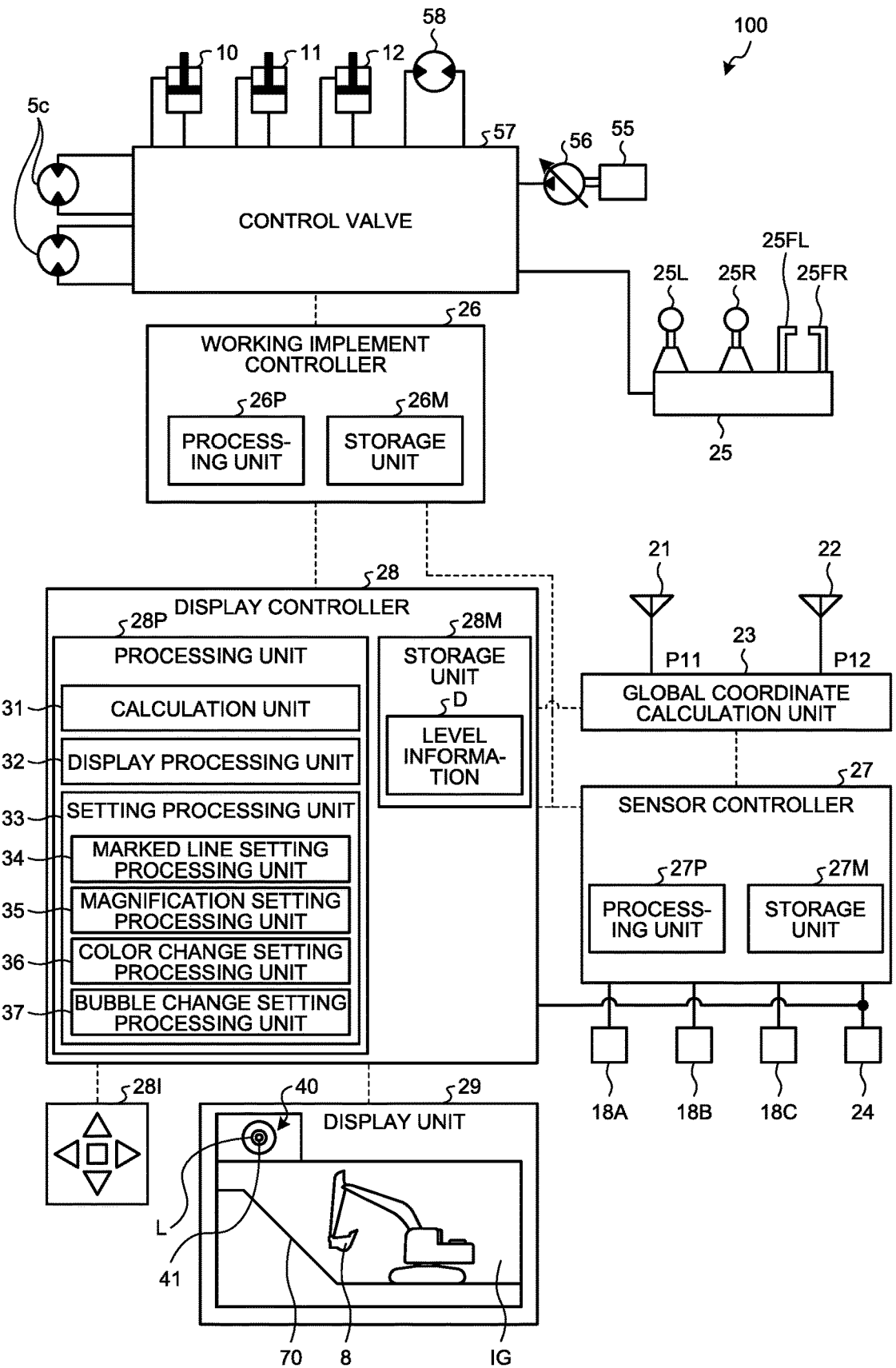
FIG. 2 is a block diagram illustrating a control system of an excavator.

The upper swinging body 3 includes an operator's cabin 4. The operator's cabin 4 is disposed on another end side of the upper swinging body 3. In other words, the operator's cabin 4 is disposed on the side opposite to the side where the machine compartment 3EG is arranged. In the operator's cabin 4, a display unit 29 and an operation device 25 illustrated in FIG. 2 are arranged. Handrails 9 are attached above the upper swinging body 3.

The upper swinging body 3 is mounted on the traveling device 5. The traveling device 5 includes crawlers 5a and 5b. The traveling device 5 is driven by one or both of hydraulic motors 5c respectively provided to left and right portions thereof. The crawlers 5a and 5b of the traveling device 5 rotate, thereby causing the excavator 100 to travel. The working implement 2 is attached to a lateral side of the operator's cabin 4 of the upper swinging body 3.

The working implement 2 includes a boom 6, an arm 7, a bucket 8 which is an example of a working tool, a boom cylinder 10, an arm cylinder 11, and a bucket cylinder 12. A proximal end of the boom 6 is pivotably attached to a front portion of the vehicle main body 1 via a boom pin 13. A proximal end of the arm 7 is pivotably attached to a distal end of the boom 6 via an arm pin 14. The bucket 8 is attached to a distal end of the arm 7 via a bucket pin 15. The bucket 8 is coupled to the bucket cylinder 12 via a link pin 16 and a link 17. The bucket 8 pivots on the bucket pin 15. A plurality of blades 8B is attached to the bucket 8 on a side opposite to the bucket pin 15. A blade edge 8T is an edge of the blade 8B.

The bucket 8 may not necessarily include the plurality of blades 8B. In other words, the bucket 8 may be a bucket which does not have the plurality of blades 8B as illustrated in FIG. 1 but has a blade edge formed of a steel plate in a straight shape. The working implement 2 may include, for example, a tilt bucket. The tilt bucket includes a bucket tilt cylinder with which a bucket is laterally tilted, and consequently, it is possible to freely shape or level a slope or a level ground even when the excavator 100 is on a slope ground. The bucket 8 may also be a bucket capable of performing a rolling-compaction operation with a bottom plate.

Each of the boom cylinder 10, the arm cylinder 11, and the bucket cylinder 12 illustrated in FIG. 1 is a hydraulic cylinder driven by pressure of fluid. The boom cylinder 10 drives and causes the boom 6 to move vertically. The arm cylinder 11 drives and causes the arm 7 to pivot on the arm pin 14. The bucket cylinder 12 drives and causes the bucket 8 to pivot on the bucket pin 15.

Antennas 21 and 22 are attached to respective upper portions of the upper swinging body 3. The antennas 21 and 22 are used for detecting a current position of the excavator 100. The antennas 21 and 22 are electrically connected to a global coordinate calculation unit 23 illustrated in FIG. 2.

FIG. 2 is a block diagram illustrating a control system of the excavator 100. The excavator 100 includes the global coordinate calculation unit 23, the operation device 25, a working implement controller 26, a sensor controller 27, a display controller 28, and the display unit 29. The operation device 25 controls a control valve 57, thereby controlling a flow rate of the fluid supplied to the boom cylinder 10, the arm cylinder 11, the bucket cylinder 12, the hydraulic motors 5c, and a swing motor 58 which swings the upper swinging body 3, from a hydraulic pump 56 driven by an engine 55.

The global coordinate calculation unit 23 detects a position of the excavator 100. The global coordinate calculation unit 23 detects the current position of the excavator 100 using Real Time Kinematic-Global Navigation Satellite Systems (RTK-GNSS). Signals in accordance with GNSS radio waves received by the antennas (GNSS antennas) 21 and 22 are input to the global coordinate calculation unit 23. The global coordinate calculation unit 23 obtains respective positions where the GNSS antennas 21 and 22 are disposed in a global coordinate system.

The global coordinate calculation unit 23 acquires two reference position data P11 and P12 expressed based on the global coordinate system. The global coordinate calculation unit 23 generates swinging body arrangement data indicating arrangement of the upper swinging body 3 based on the two reference position data P11 and P12. The swinging body arrangement data includes at least one of the two reference position data P11 and P12, and information of an azimuth of the upper swinging body 3 generated based on the two reference position data P11 and P12. The two GNSS antennas 21 and 22 may constitute a GPS compass to obtain the information of the azimuth of the upper swinging body 3. In other words, the global coordinate calculation unit 23 may calculate an azimuth angle from relative positions of the two GNSS antennas 21 and 22 without outputting the reference position data P11 and P12 of both GNSS antennas 21 and 22, and use the azimuth angle as an azimuth of the swinging body.

The operation device 25 includes a left operation lever 25L, a right operation lever 25R, a left traveling lever 25FL, and a right traveling lever 25FR. An operator of the excavator 100 operates the left operation lever 25L and the right operation lever 25R, thereby controlling an operation of the working implement 2 and the upper swinging body 3 to perform construction such as excavating with respect to a ground surface or the like which is an object to be worked. The operator operates the left traveling lever 25FL and the right traveling lever 25FR, thereby driving the hydraulic motors 5c to cause the excavator 100 to travel. In the embodiment, the left operation lever 25L, the right operation lever 25R, the left traveling lever 25FL, and the right traveling lever 25FR are pilot pressure-type levers, but not limited thereto. The left operation lever 25L, the right operation lever 25R, the left traveling lever 25FL, and the right traveling lever 25FR may be, for example, electric levers.

The working implement controller 26 includes a processing unit 26P and a storage unit 26M. The working implement controller 26 is a device which controls an operation of the working implement 2. The processing unit 26P controls the operation of the working implement 2 and the storage unit 26M stores a computer program and control data required to control the operation of the working implement 2. When performing construction with the excavator 100, the working implement 2 is controlled such that the position of the working implement 2 (in the embodiment, positions of the blade edges 8T of the bucket 8) does not erode a target construction surface indicating a target shape of an object to be constructed. Although the positions of the blade edges 8T are obtained by the display controller 28 in the embodiment, the positions may be obtained by a device other than the display controller 28.

The sensor controller 27 includes a processing unit 27P and a storage unit 27M. Various kinds of sensors which detect a state of the excavator 100 are connected to the sensor controller 27. The sensor controller 27 converts information acquired from the various kinds of sensors into a form which can be handled by other devices included in the excavator 100, and outputs the converted information. The information of the state of the excavator 100 is, for example, information of an attitude of the excavator 100 and information of an attitude of the working implement 2. In the example illustrated in FIG. 2, as sensors which detect information of the state of the excavator 100, an inertial measurement unit (IMU) 24, a first working implement attitude detection unit 18A, a second working implement attitude detection unit 18B, and a third working implement attitude detection unit 18C are connected to the sensor controller 27. However, sensors to be connected are not limited thereto.

The IMU 24 is a tilt sensor which detects an angular velocity and acceleration of the excavator 100. An attitude angle of the excavator 100 is obtained based on the angular velocity and the acceleration of the excavator 100. The first working implement attitude detection unit 18A, the second working implement attitude detection unit 18B, and the third working implement attitude detection unit 18C detect operation amounts of the boom cylinder 10, the arm cylinder 11, and the bucket cylinder 12, respectively. Information indicating an attitude of the working implement 2 is obtained from the operation amounts of the boom cylinder 10, the arm cylinder 11, and the bucket cylinder 12. The information indicating the attitude of the working implement 2 is defined, for example, by an angle $\theta 1$ formed between the boom 6 and the upper swinging body 3, an angle $\theta 2$ formed between the boom 6 and the arm 7, and an angle $\theta 3$ formed between the arm 7 and the bucket 8. The first working implement attitude detection unit 18A, the second working implement attitude detection unit 18B, and the third working implement attitude detection unit 18C may be potentiometers which detect the angles $\theta 1$, $\theta 2$, and $\theta 3$, respectively.

The sensor controller 27 acquires the information of the position of the excavator 100 in the global coordinates and the azimuth of the upper swinging body 3 obtained by the global coordinate calculation unit 23, the information of the angular velocity and the acceleration of the excavator 100 obtained by the IMU 24, and the information indicating the attitude of the working implement 2. The sensor controller 27 outputs the information of the position of the excavator 100 in the global coordinates and the azimuth of the upper swinging body 3, and the information indicating the attitude of the working implement 2 which have been acquired, to the display controller 28. The processing unit 27P of the sensor controller 27 realizes a function of the sensor controller 27. The storage unit 27M stores a computer program and data required to realize the function of the sensor controller 27.

The display controller 28 includes a processing unit 28P and a storage unit 28M. The display unit 29 is connected to the display controller 28. The display unit 29 is a device which displays various kinds of information such as an image, and for example, a touch panel having an operation function and a display function can be used. As the display unit 29, for example, a liquid crystal display panel or an organic Electro-Luminescence (EL) panel is used. The display controller 28 generates drawing information of an image displayed on the display unit 29. In the example illustrated in FIG. 2, an example of a guidance image IG used when the excavator 100 constructs an object to be constructed is displayed on the display unit 29. The guidance image IG is an image of the excavator 100 and the bucket 8 as viewed from a side surface thereof, in other words, an image of the bucket 8 in side view.

The guidance image IG displays, for example, a line indicating a cross section of a target construction surface 70 which indicates a target shape of the object to be constructed (target construction surface line 79 described later), a line indicating a cross section of a ground surface in contact with the excavator 100, which is not the object to be constructed, and a surrounding ground surface. In other words, the display controller 28 displays an image indicating a topographical cross section in the guidance image IG. In the guidance image IG, the entirety of the excavator 100 including the bucket 8 may be displayed, or the bucket 8 including the working implement 2 may be extracted and displayed. Alternatively, the bucket 8 may be extracted and displayed in the guidance image IG. A monitor-displayed level 40 and a facing compass 73 are displayed in the guidance image IG. The excavator 100 is an example of a working machine and the working machine includes other working machines such as a bulldozer which needs to detect a tilting state.

The display controller 28 obtains a position of the working implement 2 by using the position of the excavator 100 in the global coordinates and the azimuth of the upper swinging body 3, the information indicating the attitude of the working implement 2 acquired from the sensor controller 27, and information indicating a dimension of the working implement 2. The information indicating the dimension of the working implement 2 is stored in advance, for example, in the storage unit 28M of the display controller 28. The position of the working implement 2 obtained by the display controller 28 is, for example, positions of the blade edges 8T of the bucket 8. The positions of the blade edges 8T of the bucket 8 obtained by the display controller 28 are positions in the global coordinate system. When causing the display unit 29 to display the guidance image IG, the display controller 28 causes the display unit 29 to display the obtained positions of the blade edges 8T and the target construction surface 70 at the same time. The operator of the excavator 100 can easily grasp a positional relationship between the blade edges 8T and the target construction surface 70 from the guidance image IG displayed on the display unit 29, which improves work efficiency. Although the positions of the blade edges 8T are obtained by the display controller 28 in the embodiment, the positions may be obtained by a device other than the display controller 28.

For example, when causing the display unit 29 to display the guidance image IG, the display controller 28 generates drawing information for drawing a side surface of the bucket 8 using information of the shape and the dimension of the bucket 8. The display unit 29 displays an image of the side surface of the bucket 8 based on the drawing information generated by the display controller 28.

The processing unit 28P of the display controller 28 performs a function of the display controller 28, for example, generating a drawing information for drawing an image of the bucket 8 in side view, or generating a drawing information of the target construction surface 70 included in the guidance image IG. The storage unit 28M stores a computer program and data required to realize the function of the display controller 28. For example, information of design topography for generating the target construction surface 70 and information of the dimension of the working implement 2 are included in the data.

An input device 28I is connected to the display controller 28. The input device 28I inputs the information of the shape and the dimension of the bucket 8 to the display controller 28, outputs a command to switch a display on the display unit 29 to the display controller 28, and outputs, to the display controller 28, a command addressed to a setting processing unit 33 described later. In the embodiment, the input device 28I is a touch panel-type device, or is configured to include an operation member such as a hard key or a switch. When the input device 28I is the touch panel-type device, the display unit 29 is a touch panel as described above, and the input device 28I and the display unit 29 are integrated therein.

The processing unit 26P of the working implement controller 26, the processing unit 27P of the sensor controller 27, and the processing unit 28P of the display controller 28 are realized, for example, by a processor such as a Central Processing Unit (CPU) and a memory. As the storage unit 26M of the working implement controller 26, the storage unit 27M of the sensor controller 27, and the storage unit 28M of the display controller 28, at least one of a volatile or non-volatile semiconductor memory, a magnetic disk, a flexible disk, and a magneto-optical disc is used. Examples of the volatile or non-volatile semiconductor memory include a Random Access Memory (RAM), a Read Only Memory (ROM), a flash memory, an Erasable Programmable Read Only Memory (EPROM), and an Electrically Erasable Programmable Read Only Memory (EEPROM).

<Guidance Image IG>

Figure 3:
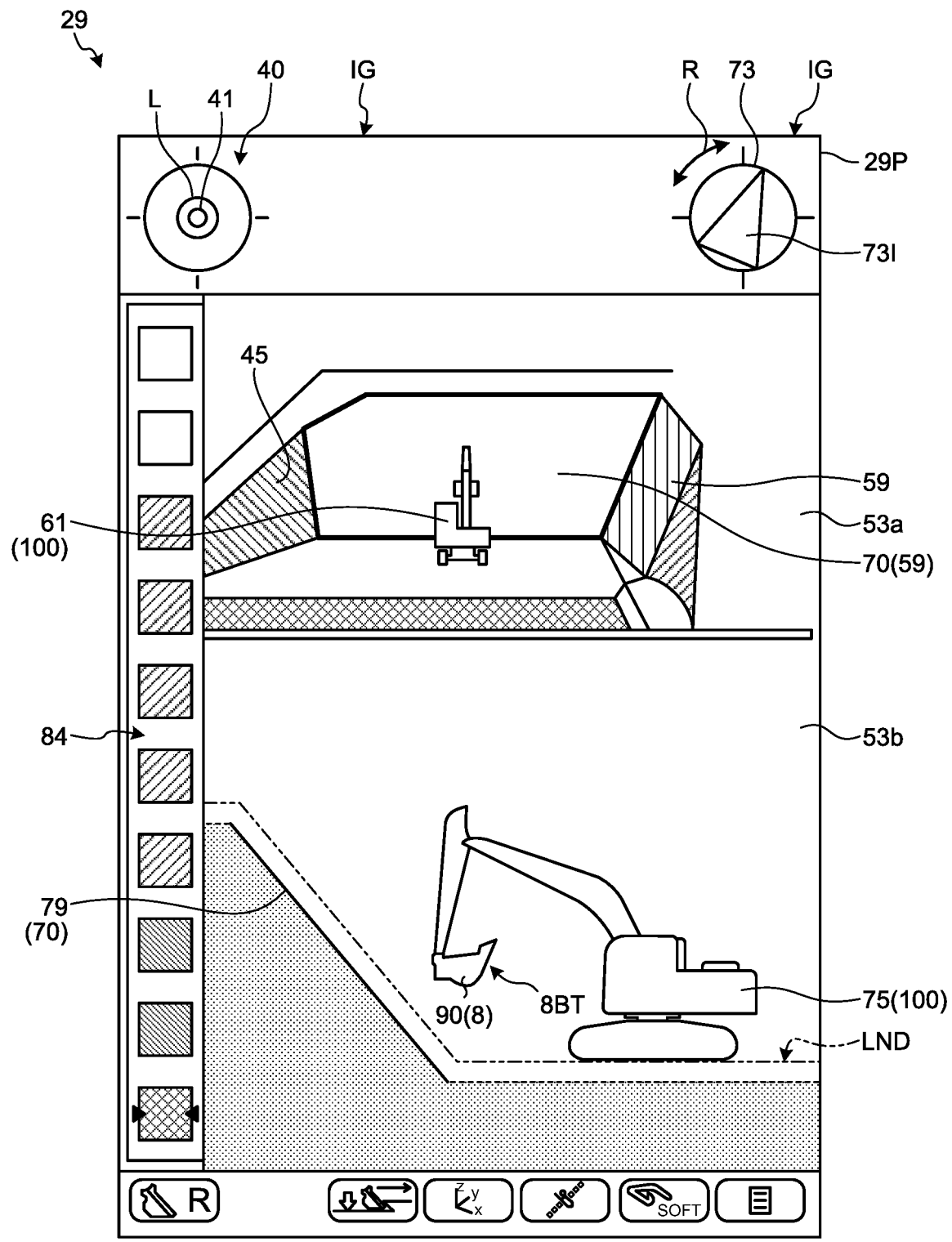
FIG. 3 is a view illustrating an example of a guidance image.

FIG. 3 is a view illustrating an example of the guidance image IG. The guidance image IG indicates a positional relationship between the target construction surface 70 and the blade edges 8T of the bucket 8. The guidance image IG is an image for guiding the operator of the excavator 100 to an operation of the working implement 2 such that a ground surface as an example of an object to be constructed is formed into the same shape as that indicated by the target construction surface 70.

The guidance image IG is displayed, for example, on a display screen 29P of the display unit 29. The guidance image IG includes a front view 53a and a side view 53b. The front view 53a illustrates design topography of a construction area, in other words, a design surface 45 including the target construction surface 70 and a current position of the excavator 100. The side view 53b illustrates a positional relationship between the target construction surface 70 and the excavator 100. The front view 53a of the guidance image IG expresses design topography in front view by a plurality of triangular polygons. As illustrated in the front view 53a, the display controller 28 causes the display unit 29 to display the plurality of triangular polygons collectively as a design surface 59 or the target construction surface 70. FIG. 3 illustrates a state where the design topography is a slope, and the excavator 100 is facing the slope. The front view 53a may display the design topography, in other words, the design surface 59 including the target construction surface 70 and the current position of the excavator 100 in a three-dimensional form such as a bird's eye view.

The target construction surface 70 selected as a target object to be worked from a plurality of design surfaces 59 is displayed in a color different from that of other design surfaces 59. For example, when a touch panel is used for the display unit 29, the operator of the excavator 100 can select the target construction surface 70 by touching by finger a portion corresponding to the target construction surface 70 among the plurality of design surfaces 59 displayed on the display screen 29P. The current position of the excavator 100 is represented by an icon 61 of the excavator 100 as viewed from a back thereof in the front view 53a in FIG. 3. However, the current position may be represented by another symbol. The front view 53a includes information for causing the excavator 100 to face the target construction surface 70. The information for causing the excavator 100 to face the target construction surface 70 is displayed as the facing compass 73 based on a calculation result of the positional relationship between the excavator 100 (the blade edges 8T of the bucket 8) and the target construction surface 70. The facing compass 73 is attitude information such as a pattern or an icon for giving guidance, for example, by an arrow-shaped pointer 731 rotating as indicated by an arrow R, to a facing direction with respect to the target construction surface 70 and a direction to which the excavator 100 is caused to swing. In addition, as described above, the monitor-displayed level 40 is displayed.

The guidance image IG includes an image indicating the positional relationship between the target construction surface 70 and the blade edges 8T of the bucket 8, and distance information indicating distance between the target construction surface 70 and the blade edges 8T of the bucket 8. In the embodiment, the side view 53b includes the target construction surface line 79, an icon 75 of the excavator 100 in side view, an icon 90 of the bucket 8 in side view, and a ground surface LND with which the excavator 100 is in contact. The target construction surface line 79 indicates a cross section of the target construction surface 70. The target construction surface line 79 is obtained by calculating an intersection line between a plane parallel to the center of the working implement which passes the current position of the blade edges 8T of the bucket 8 and the design surface 59. The intersection line is obtained by the processing unit 28P of the display controller 28. The plane parallel to the center of the working implement is, for example, a plane which passes the center in a width direction of the bucket pin 15 illustrated in FIG. 1 and is perpendicular to a direction in which the bucket pin 15 extends.

In the side view 53b, the distance information indicating distance between the target construction surface 70 and the blade edges 8T of the bucket 8 includes graphic information 84. The distance between the target construction surface 70 and the blade edges 8T of the bucket 8 is, for example, distance between a point where a line drawn downward from a blade edge 8T to the target construction surface 70 in a vertical direction (gravitational direction) and the target construction surface 70 intersect with each other, and the blade edge 8T. The distance between the target construction surface 70 and the blade edges 8T of the bucket 8 may be distance between an intersection point obtained when a vertical line is drawn downward from a blade edge 8T to the target construction surface 70, and the blade edge 8T.

The graphic information 84 refers to an information graphically indicating the distance between the blade edges 8T of the bucket 8 and the target construction surface 70. The graphic information 84 is a guiding indicator for indicating the positions of the blade edges 8T of the bucket 8. In order to indicate a positional relationship between the target construction surface line 79 and the excavator 100 in the guidance image IG, the distance therebetween may be displayed by a numerical value (not illustrated). The operator of the excavator 100 can easily perform excavation such that current topography is formed into the design topography (target construction surface 70) by moving the blade edges 8T of the bucket 8 along the target construction surface line 79.

As described above, the display controller 28 illustrated in FIG. 2 generates drawing information for drawing the side surface of the bucket 8 using the information of the shape and the dimension of the bucket 8. Regarding the bucket 8 displayed on the display unit 29 based on the drawing information, an image thereof in side view is displayed. The bucket 8 in side view means that the bucket 8 is viewed from a direction in which the bucket pin 15 extends. The bucket 8 in side view includes an image indicating a bottom surface 8BT of the bucket 8.

<Display Control System of Monitor-Displayed Level>

The monitor-displayed level 40 is displayed on a display screen of the display unit 29, for example, a display region of the guidance image IG. A bubble-tube level as viewed from a top surface thereof is displayed as the monitor-displayed level 40. The monitor-displayed level 40 is displayed based on a polar coordinate system, and as a tilting position, a central position of a bubble 41 indicates a magnitude and a direction of tilt of the excavator 100. The bubble 41 indicates the tilting position on the polar coordinate system. A marked line L is displayed on the monitor-displayed level 40. The marked line L is an indicator indicating a preset magnitude of tilt, and expressed as a circle with an origin of the polar coordinate system as a center thereof.

The IMU 24 detects the angular velocity and the acceleration of the excavator 100 as described above. With an operation of the excavator 100, various types of acceleration occur in the excavator 100. Examples thereof include acceleration occurred while traveling, angular acceleration and gravity acceleration occurred while swinging. The IMU 24 detects acceleration including at least gravity acceleration, and outputs the detected acceleration without distinguishing between the types of acceleration. The gravity acceleration is acceleration corresponding to gravity. The IMU 24 detects acceleration in each of an x-axis direction, a y-axis direction and a z-axis direction on a vehicle coordinate system (x, y, z) illustrated in FIG. 1, and an angular velocity ω around each of the x-axis, the y-axis, and the z-axis.

The IMU 24 is attached to the upper swinging body 3. Although it is preferable to dispose the IMU 24, for example, on a central axis of swing of the upper swinging body 3 of the excavator 100 in order to detect acceleration and the like with higher accuracy, the IMU 24 may be disposed at a lower portion of the operator's cabin 4.

The IMU 24 outputs, to the display controller 28 via the sensor controller 27, at least a pitch angle θp obtained by time integration of the angular velocity around the x-axis, a roll angle θr obtained by time integration of the angular velocity around the y-axis, and a yaw angle θy obtained by time integration of the angular velocity around the z-axis, which are illustrated in FIG. 1. The IMU 24 may be directly connected to the display controller 28 without via the sensor controller 27. In a case where the IMU 24 is directly connected to the display controller 28, a process performed by the sensor controller 27 is performed by the display controller 28. The IMU 24 updates the acceleration and the angular velocity of the excavator 100 in a predetermined cycle.

As illustrated in FIG. 2, the processing unit 28P includes a calculation unit 31, a display processing unit 32, and the setting processing unit 33. The setting processing unit 33 includes any one of a marked line setting processing unit 34, a magnification setting processing unit 35, a color change setting processing unit 36, and a bubble change setting processing unit 37. The calculation unit 31 calculates a tilting position on polar coordinates which indicates a magnitude and a direction of tilt of the excavator 100 based on the pitch angle θp and the roll angle θr of the excavator 100 detected by the IMU 24. In other words, the magnitude and the direction of tilt of the excavator 100 with respect to a horizontal plane (xy plane) are calculated. The display processing unit 32 displays, on a predetermined region, for example, on the guidance image IG on a monitor screen of the display unit 29, a display of a level which performs a polar coordinate display of the tilting position obtained by the calculation unit 31 and the marked line L indicating a preset magnitude of tilt. The IMU 24 is an example of a tilt sensor, and as the tilt sensor, those capable of detecting the pitch angle θp and the roll angle θr of the excavator 100 may be used. Here, the display system includes the tilt sensor such as the IMU 24, the calculation unit 31, the display processing unit 32, the setting processing unit 33, and the display unit 29.

The marked line setting processing unit 34 performs a setting to change the magnitude of tilt indicated by the marked line L in the monitor-displayed level 40. The magnification setting processing unit 35 performs a setting to change a display magnification of a magnitude of tilt in the monitor-displayed level 40. The color change setting processing unit 36 performs a setting to change a color of a screen of the monitor-displayed level 40. The bubble change setting processing unit 37 performs a setting to change a size and a color of the bubble 41 which indicates a magnitude and a direction of tilt in the monitor-displayed level 40. The bubble change setting processing unit 37 functions as an indicator image change setting processing unit which performs a setting to change the size and the color of the bubble 41, which is an example of an indicator image. In the storage unit 28M, setting information of the monitor-displayed level 40 is stored as level information D.

<Calculation Process of Calculation Unit>

Figure 4:
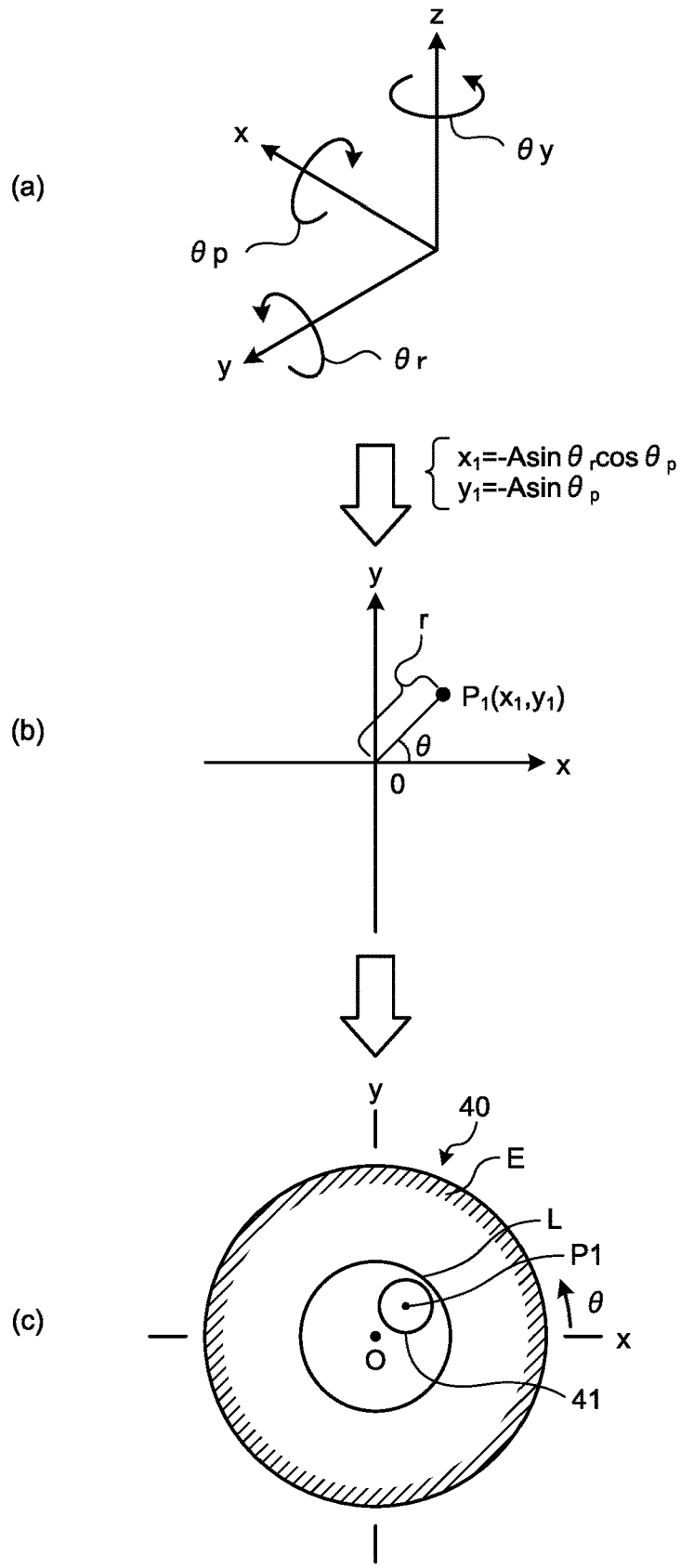
FIG. 4 is an explanation diagram for explaining a process of a calculation unit.

As illustrated in FIG. 4, by using the pitch angle θp and the roll angle θr acquired by the IMU 24 (see part (a) of FIG. 4) and applying the following equations (1) and (2), the calculation unit 31 obtains a tilting position P1 (x1, y1) (see part (b) of FIG. 4) on the polar coordinates.

$$x1 = -A \cdot \sin \theta r \cdot \cos \theta p \quad (1)$$

$$y1 = -A \cdot \sin \theta p \quad (2)$$

A is a constant.

As illustrated in part (b) of FIG. 4 and part (c) of FIG. 4, in a polar coordinate display of the monitor-displayed level 40, the bubble 41 is displayed in a display region E. The bubble 41 is drawn as a circle with the tilting position P1 as a center thereof. The display region E is a circle which expresses a magnitude of tilt as a size thereof in a radial direction from the center O. Distance between the center O and the tilting position P1 indicates the magnitude of tilt, and an angle θ from the x-axis indicates the direction of tilt. The marked line L is displayed as a circle indicating a preset magnitude rL of tilt from the center O.

<Color Display in Monitor-Displayed Level>

Figure 5:
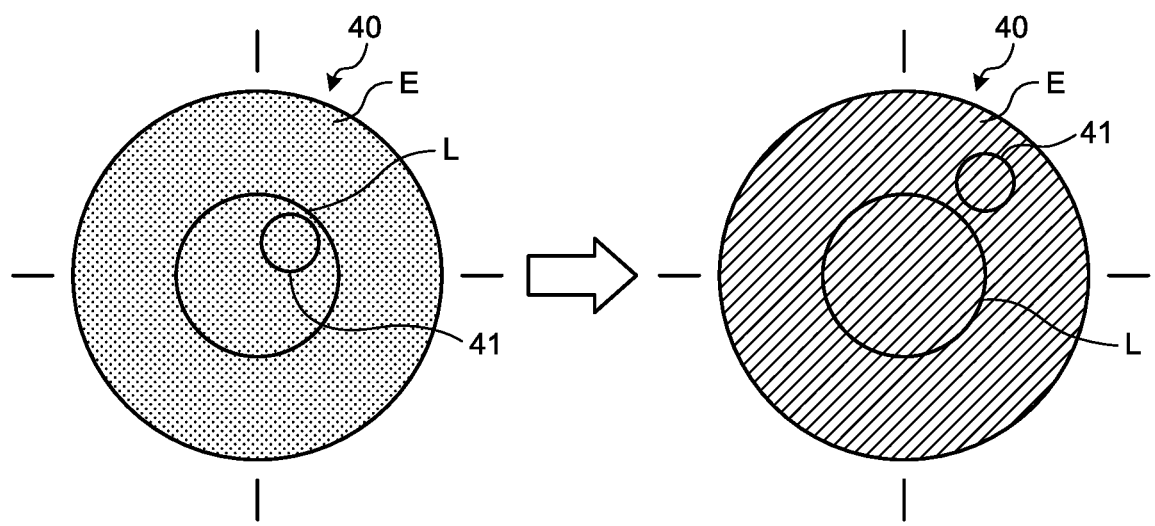
FIG. 5 is a diagram illustrating an example in which a color is changed in a display when a marked line is exceeded.

As illustrated in FIG. 5, when the magnitude of tilt of the bubble 41 exceeds the marked line L, the display processing unit 32 changes a color of the monitor-displayed level 40 to notify the operator that the tilt has exceeded the marked line L. Whether the bubble 41 exceeds the marked line L is determined by determining whether the center of a circle of the bubble 41 (the tilting position P1) has exceeded the marked line L. The color change may be a change in various color elements such as brightness, luminance, and saturation. Alternatively, the color change may be performed by increasing or decreasing a value of each color element. In any case, it is sufficient to indicate that the magnitude of tilt of the bubble 41 has exceeded the marked line L.

Figure 6:
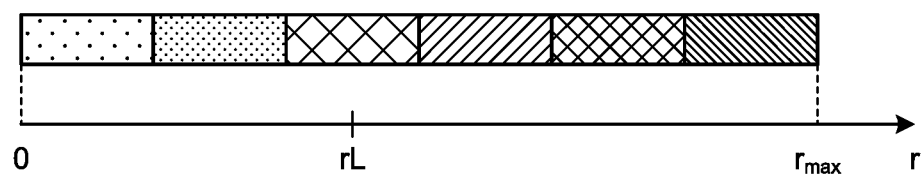
FIG. 6 is a diagram illustrating a stepwise color change.
Figure 7:
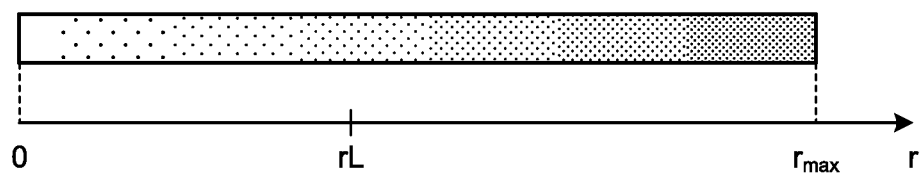
FIG. 7 is a diagram illustrating a continuous color change.

The color may be changed when the bubble 41 exceeds the marked line L, and in addition, as illustrated in FIG. 6, the color may be changed stepwise in accordance with an increase in a magnitude r of tilt of the bubble 41. Furthermore, as illustrated in FIG. 7, the color may be changed continuously in accordance with the increase in the magnitude r of tilt of the bubble 41. In other words, gradation of the color may be generated. In both cases of FIGS. 6 and 7, various color elements such as brightness, luminance, and saturation may be changed stepwise or continuously.

<Marked Line Setting in Monitor-Displayed Level>

Figure 8:
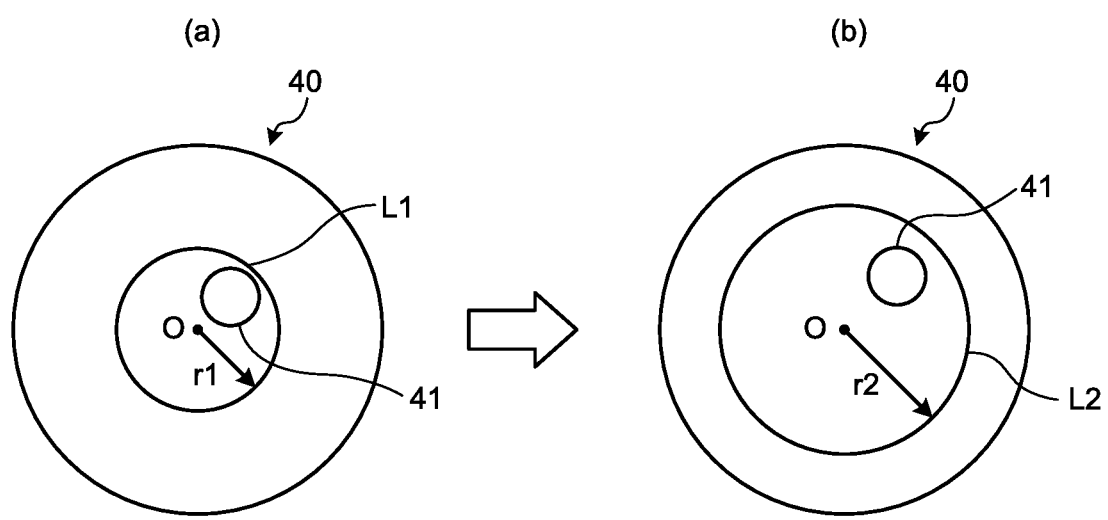
FIG. 8 is a diagram illustrating a display state of the monitor-displayed level in a case where a magnitude of tilt of the marked line is changed to be increased.

As illustrated in FIG. 8, a marked line L1 having a magnitude r1 of tilt (see part (a) of FIG. 8) may be changed to a marked line L2 having a magnitude r2 of tilt (see part (b) of FIG. 8) greater than the magnitude r1 of tilt (>r1). This change is set by the marked line setting processing unit 34. Preferably, when content of work performed by the excavator 100 requires a high degree of leveling, the marked line L1 having the smaller magnitude r1 of tilt is set, and when the content of work does not require such a high degree of leveling, the marked line L2 having the greater magnitude r2 of tilt is set.

<Magnification Setting in Monitor-Displayed Level>

Figure 9:
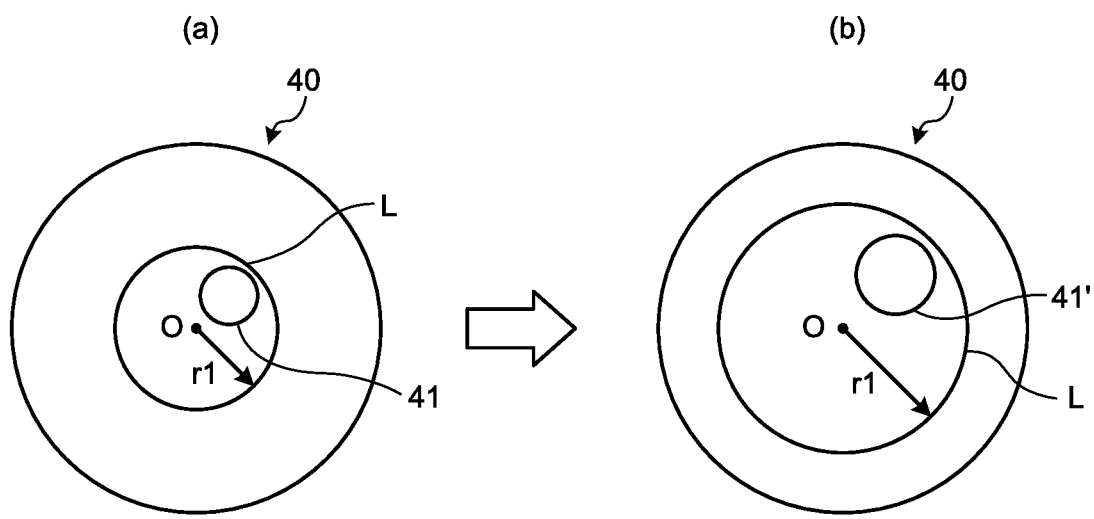
FIG. 9 is a diagram illustrating a display state of the monitor-displayed level in a case where a display magnification is increased.

As illustrated in FIG. 9, a display magnification of the monitor-displayed level 40 may alternatively be changed. An increase in the display magnification means an enlargement of a display performed by increasing a coordinate scale amplitude in a radial direction from the center O of the polar coordinates. In that case, it is possible to observe the change in the magnitude r1 of tilt of the bubble 41 with high accuracy. The increase in the display magnification also means an increase in display sensitivity. The increase in the display sensitivity means an increase in the constant A in each of the equations (1) and (2). As illustrated in part (b) of FIG. 9, the size of the bubble 41 may be changed correspondingly to the display magnification. In part (b) of FIG. 9, since the display magnification is increased, the circle of the bubble 41 is increased in size in accordance with the display magnification to obtain a larger bubble 41'.

<Setting Screen>

Figure 10:
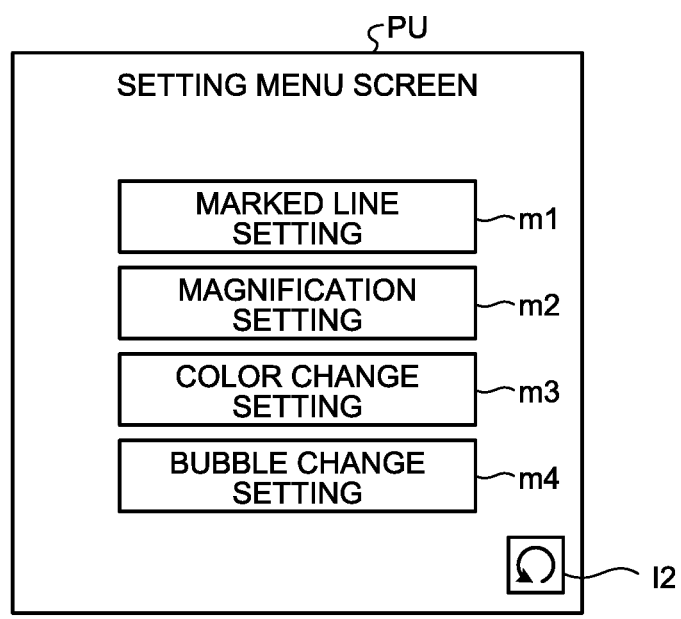
FIG. 10 is a diagram illustrating an example of a setting menu screen.

When performing various settings such as a marked line setting, a magnification setting, a color change setting, and a bubble change setting, such a setting is selected by touching an icon of the monitor-displayed level 40 on the display screen 29P. By the selection, a pop-up display of a setting menu screen PU illustrated in FIG. 10 is performed on the display screen 29P. The setting menu screen PU displays each of menu items, i.e. a marked line setting m1, a magnification setting m2, a color change setting m3, and a bubble change setting m4. When any of the menu items is selected, a setting screen for the selected item is displayed. Further, when a return icon I2 is selected, the setting menu screen PU disappears from the display screen 29P.

<Marked Line Setting Screen>

Figure 11:
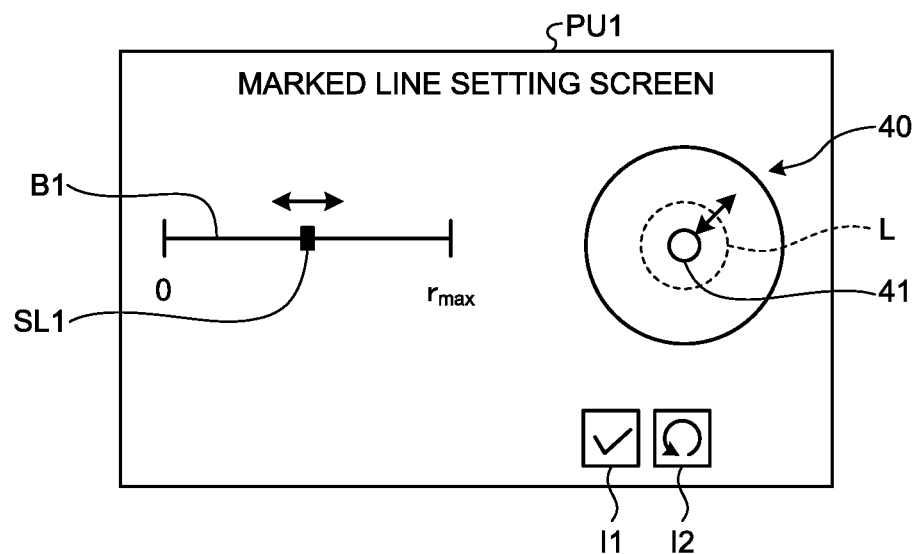
FIG. 11 is a diagram illustrating an example of a marked line setting screen.

When the marked line setting m1 in FIG. 10 is selected, a marked line setting screen PU1 illustrated in FIG. 11 is displayed. The marked line setting screen PU1 displays an adjusting bar B1 on a left side of the screen. A magnitude r of tilt of the marked line L can be set by dragging a slider SL1 on the adjusting bar B1. On a right side of the screen, a display state of the monitor-displayed level 40 currently being adjusted is displayed. When a setting icon I1 on a lower side of the screen is selected, currently adjusted content is set. On the other hand, when the return icon I2 is selected, the content of current adjustment is canceled, and the screen returns to the setting menu screen PU.

Figure 12:
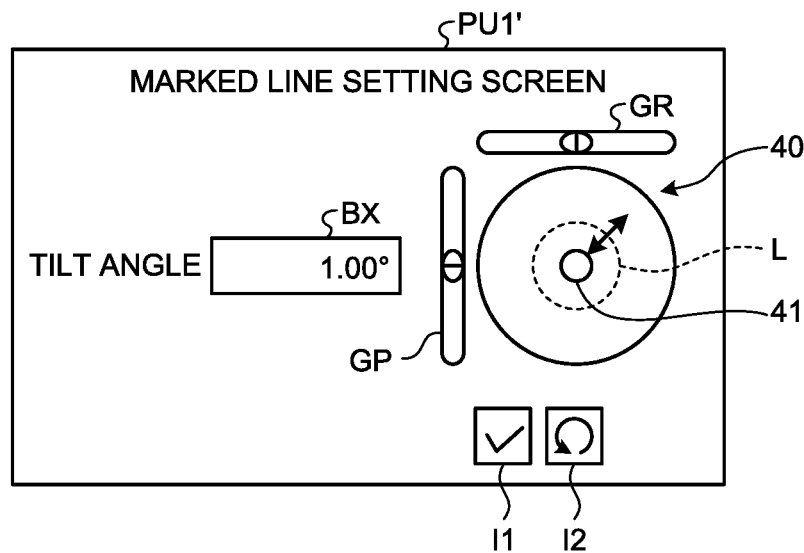
FIG. 12 is a diagram illustrating another example of the marked line setting screen.

In the marked line setting screen PU1, the adjusting bar B1 is slid to set the magnitude r of tilt of the marked line L. However, there is no limitation thereto. As illustrated in FIG. 12, a marked line setting screen PU1' may be employed in which a numerical valued of the magnitude r of tilt of the marked line L can be input, as a tilt angle, into a numerical value input box BX. In that case, when the numerical value input box BX is selected, a pop-up display of a numerical value input key or the like (not illustrated) is performed. In the marked line setting screen PU1' illustrated in FIG. 12, a liquid bubble-tube gauge GR is provided above the monitor-displayed level 40, and a liquid bubble-tube gauge GP is provided to the left of the monitor-displayed level 40. The liquid bubble-tube gauge GR and the liquid bubble-tube gauge GP indicate lateral and longitudinal tilts of the excavator 100, respectively. The liquid bubble-tube gauge GR displays a bubble corresponding to the roll angle θr. The liquid bubble-tube gauge GP displays a bubble corresponding to the pitch angle θp. Consequently, a tilting state of the excavator 100 indicated by the monitor-displayed level 40 is more easily recognized. The liquid bubble-tube gauges GR and GP may be displayed, not only on the marked line setting screen PU1', but also on the monitor-displayed level 40 on the display screen 29P illustrated in FIG. 3.

<Magnification Setting Screen>

Figure 13:
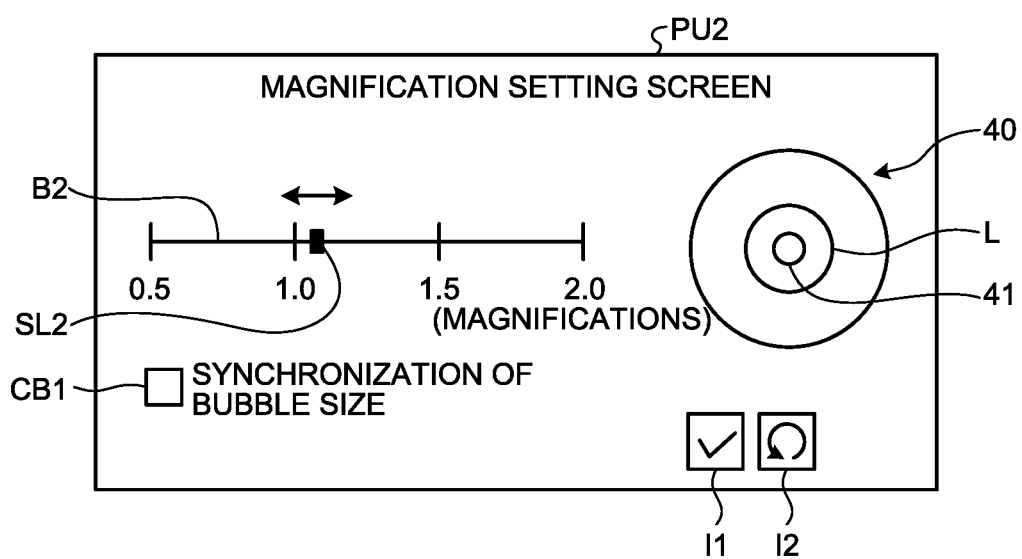
FIG. 13 is a diagram illustrating an example of a magnification setting screen.

When the magnification setting m2 in FIG. 10 is selected, a magnification setting screen PU2 illustrated in FIG. 13 is displayed. The magnification setting screen PU2 displays an adjusting bar B2 on a left side of the screen. A display magnification can be set by dragging a slider SL2 on the adjusting bar B2. In addition, a check box CB1 is displayed on the left side of the screen. The check box CB1 is used to determine whether to synchronize the size of the bubble 41 with the change in the display magnification. When the check box CB1 is checked, a setting is performed in which the size of the bubble 41 is synchronized with the display magnification. When the synchronization setting is performed, the size of the bubble 41 is expanded or contracted in accordance with the display magnification. On a right side of the screen, a display state of the monitor-displayed level 40 currently being adjusted is displayed. When a setting icon I1 on a lower side of the screen is selected, currently adjusted content is set. On the other hand, when the return icon I2 is selected, the content of current adjustment is canceled, and the screen returns to the setting menu screen PU. As with the marked line setting screen PU1', the magnification setting screen PU2 may be those in which a numerical value of the display magnification can be input instead of using the adjusting bar B2 and the slider SL2.

<Color Change Setting Screen>

Figure 14:
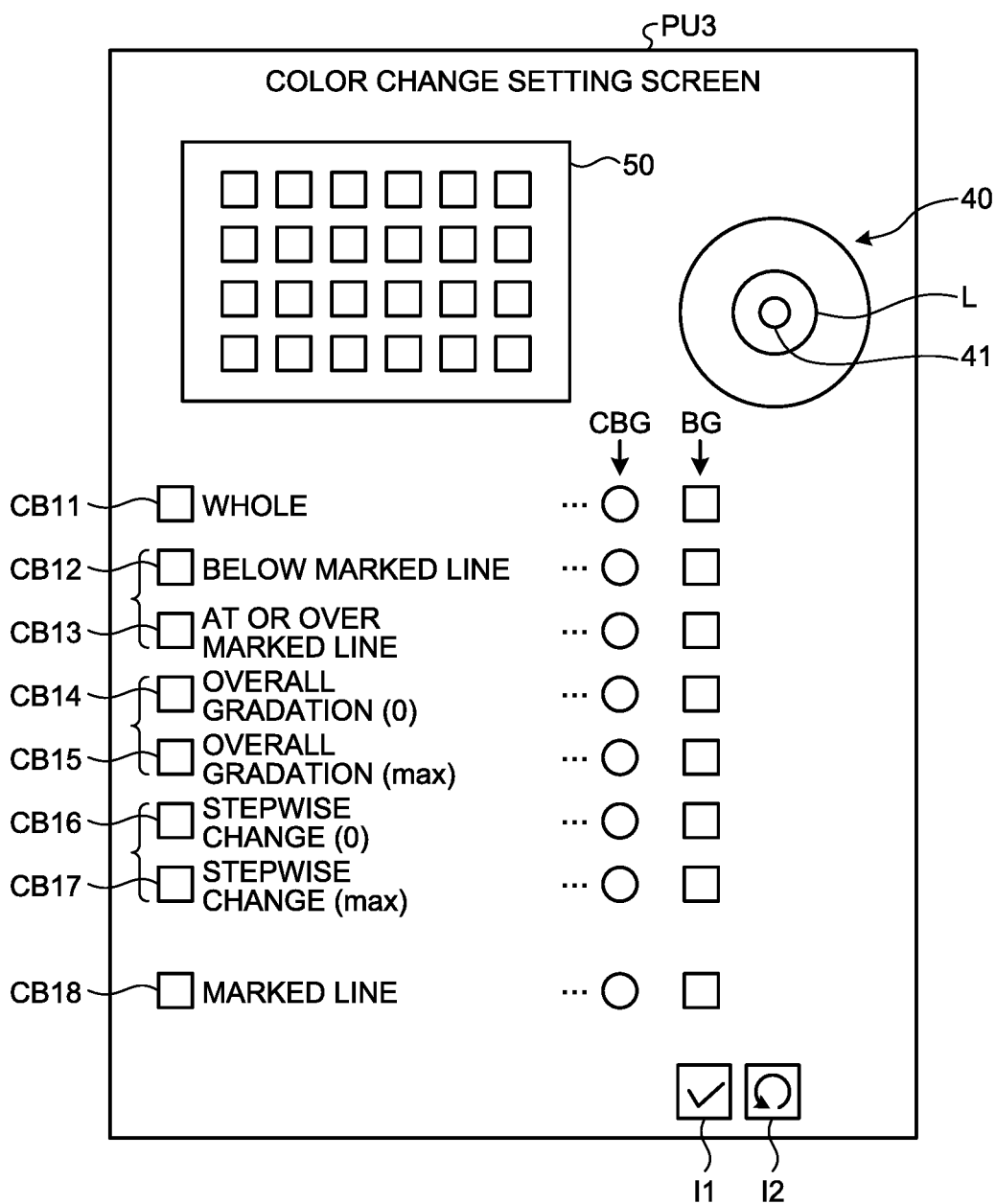
FIG. 14 is a diagram illustrating an example of a color change setting screen.

When the color change setting m3 in FIG. 10 is selected, a color change setting screen PU3 illustrated in FIG. 14 is displayed. In the color change setting screen PU3, a color sample 50 is displayed on a left upper side of the screen. In addition, on a left lower side thereof, various kinds of color change settings are displayed. Specifically, check boxes CB11, CB12, CB13, CB14, CB15, CB16, CB17, and CB18 are provided. The check box CB11 is used for setting a color of the monitor-displayed level 40 as a whole. The check boxes CB12 and CB13 are used for setting colors employed when the bubble 41 is below the marked line L and when the bubble 41 is at or over the marked line L, respectively. The check boxes CB14 and CB15 are check boxes for overall gradations used for continuously changing a color in accordance with a change in the magnitude of tilt of the bubble 41. The check boxes CB16 and CB17 are check boxes for stepwise change used for changing a color stepwise in accordance with a change in the magnitude of tilt of the bubble 41. The check box CB18 is a check box for a marked line used for setting a color of the marked line L itself. The four categories respectively including the check box CB11, the check boxes CB12 and CB13, the check boxes CB14 and CB15, and the check boxes CB16 and CB17, are alternatively selected. Regarding the color setting for each of the check boxes CB11 to CB18, a corresponding color setting check box CBG is selected, a color for the selected item is selected from the color sample 50, and the selected color is displayed in a color box BG. A check box may be provided which is used for blinking the screen of the monitor-displayed level 40 when the bubble 41 exceeds the marked line L. On a right side of the screen, a display state of the monitor-displayed level 40 during color setting is displayed. In that case, a change in color is repetitively displayed while moving the bubble 41. When a setting icon I1 on a lower side of the screen is selected, currently adjusted content is set. On the other hand, when the return icon I2 is selected, the content of current adjustment is canceled, and the screen returns to the setting menu screen PU.

<Bubble Change Setting Screen>

Figure 15:
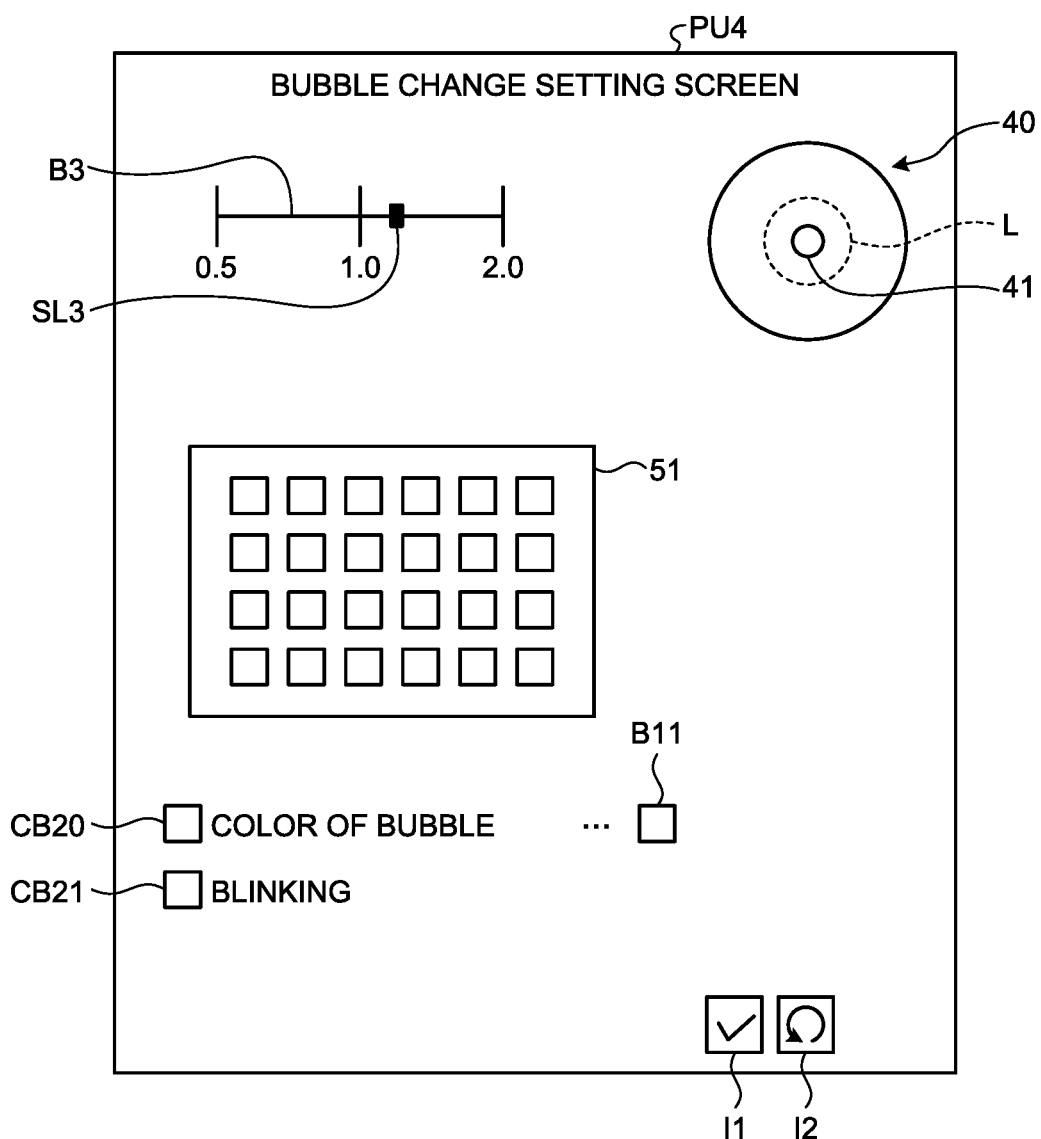
FIG. 15 is a diagram illustrating an example of a bubble change setting screen.

When the bubble change setting m4 in FIG. 10 is selected, a bubble change setting screen PU4 illustrated in FIG. 15 is displayed. The bubble change setting screen PU4 displays an adjusting bar B3 on a left upper portion of the screen. A size of the bubble can be set by dragging a slider SL3 on the adjusting bar B3. A color sample 51 is displayed on a left center portion of the screen. In addition, on a left lower side of the screen, check boxes CB20 and CB21 are provided. The check box CB20 is used for setting a color of the bubble. The check box CB21 is used, when the bubble 41 exceeds the marked line L, for blinking the bubble. In a box B11, a color selected from the color sample 51 is displayed. On a right side of the screen, a display state of the monitor-displayed level 40 during bubble setting is displayed. When a setting icon I1 on a lower side of the screen is selected, currently adjusted content is set. On the other hand, when the return icon I2 is selected, the content of current adjustment is canceled, and the screen returns to the setting menu screen PU.

Figure 16:
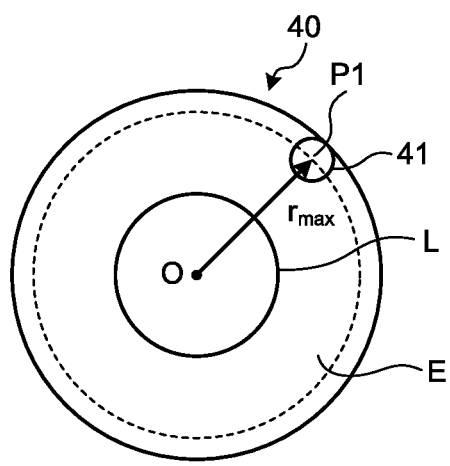
FIG. 16 is a diagram illustrating an example in which a periphery of a display region is enlarged in consideration of a radius of a bubble.

As illustrated in FIG. 16, when the magnitude r of tilt of the bubble 41 reaches the maximum value rmax, the maximum value rmax is distance between the center O of the polar coordinates and the tilting position P1, which is the center of the bubble 41, and therefore, it is preferable to expand the display region E of the monitor-displayed level 40 by a radius of the bubble 41.

Figure 17:
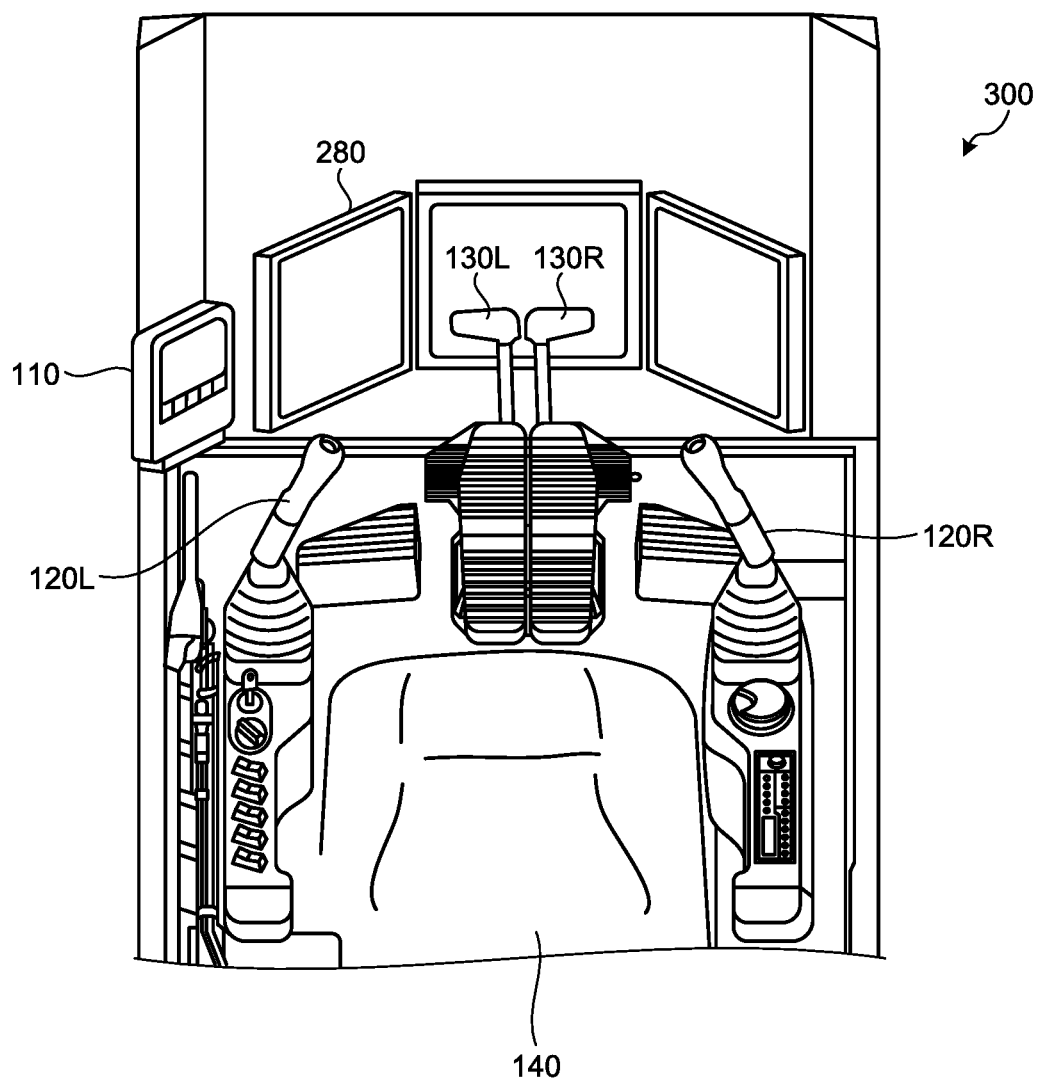
FIG. 17 is a view explaining a display device when an excavator is remotely operated.

Although the display unit 29 is mounted on the excavator 100 in the embodiment, there is no limitation thereto. When a working machine such as the excavator 100 is remotely operated from a remote operation room, a display device corresponding to the display unit 29 is provided in the remote operation room. FIG. 17 is a view explaining a display device 280 when the excavator 100 is remotely operated. The excavator 100 and a remote operation room 300 can wirelessly communicate with each other via a communication device (not illustrated). As illustrated in FIG. 17, the remote operation room 300 is provided with an operator's seat 140, and working implement operation members 120L and 120R are disposed in the vicinity of the operator's seat 140. In addition, traveling operation members 130L and 130R are disposed anteriorly to the operator's seat 140. By operating the working implement operation members 120L and 120R, a signal which indicates an amount of an operation and content of the operation is transmitted to the excavator 100, and as a result, the working implement 2 and the upper swinging body 3 can be remotely operated. By operating the traveling operation members 130L and 130R, a signal which indicates an amount of an operation and content of the operation is transmitted to the excavator 100, and as a result, the traveling device 5 can be remotely operated.

In the remote operation room 300, a monitor device 110 is disposed, as viewed from the operator's seat 140, at a position obliquely anterior thereto. Data detected by various sensors provided to the excavator 100 are wirelessly transmitted to the remote operation room 300 via the communication device, and monitor device 110 displays various kinds of information based on the data. Furthermore, a display device including the display device 280 corresponding to the display unit 29 is disposed anteriorly to the operator's seat 140. The display controller 28 may be provided to the remote operation room 300, or may be provided to the excavator 100. Furthermore, when the display controller 28 is provided to the remote operation room 300, only the calculation unit 31 maybe provided on a side of the excavator 100. In other words, at least one of the display unit 29, the calculation unit 31, the display processing unit 32, and the setting processing unit 33 described above may be provided outside the excavator 100.

Figure 18:
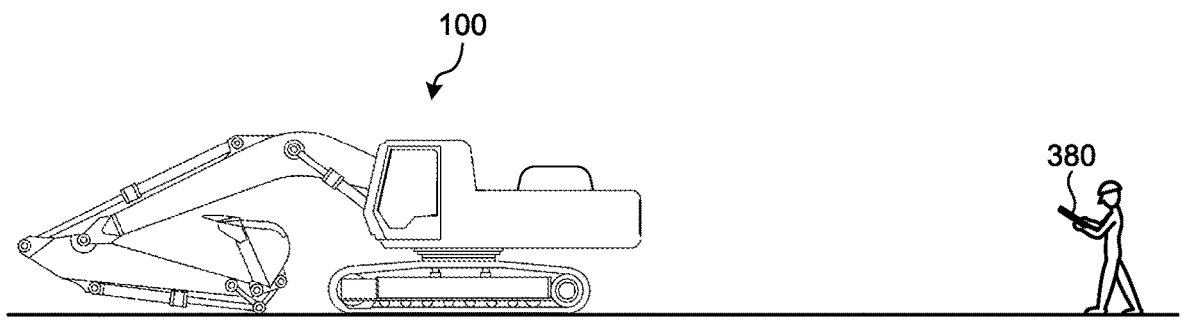
FIG. 18 is a view illustrating an example in which a monitor-displayed level is displayed on a display unit of a mobile terminal device outside the excavator.

Consequently, it is possible to display, by the display device 280, a monitor-displayed level similar to the monitor-displayed level 40 displayed on the display screen 29P of the display unit 29 depicted in the above embodiment. As illustrated in FIG. 18, a mobile terminal device 380 including at least a display unit may be used as a display device instead of the display device 280 disposed in the remote operation room 300. In that case, the display controller 28 is preferably disposed on the side of the excavator 100.

In addition, although a setting operation with respect to the setting processing unit 33 is performed on the display screen of the display unit 29 in the above embodiment, there is no limitation thereto. For example, the setting operation with respect to the setting processing unit 33 may be performed using a switch provided to a console of the excavator 100 or a console of the remote operation room 300.

Furthermore, although one example has been described in the above embodiment in which example a monitor-displayed level is displayed on a monitor mounted on a construction machine using Information and Communication Technology (ICT), the monitor-displayed level may be displayed on a monitor mounted on a general construction machine.

REFERENCE SIGNS LIST

1 VEHICLE MAIN BODY
2 WORKING IMPLEMENT
3EG MACHINE COMPARTMENT
3 UPPER SWINGING BODY
4 OPERATOR'S CABIN
5 TRAVELING DEVICE
5c HYDRAULIC MOTOR
5a, 5b CRAWLER
6 BOOM
7 ARM
8 BUCKET
8B BLADE
8T BLADE EDGE
8BT BOTTOM SURFACE
9 HANDRAIL
10 BOOM CYLINDER
11 ARM CYLINDER
12 BUCKET CYLINDER
13 BOOM PIN
14 ARM PIN
15 BUCKET PIN
16 LINK PIN
17 LINK
18A, 18B, 18C WORKING IMPLEMENT ATTITUDE DETECTION UNIT
21, 22 ANTENNA
23 GLOBAL COORDINATE CALCULATION UNIT
24 IMU (TILT SENSOR)
25 OPERATION DEVICE
25R RIGHT OPERATION LEVER
25FR RIGHT TRAVELING LEVER
25L LEFT OPERATION LEVER
25FL LEFT TRAVELING LEVER
26 WORKING IMPLEMENT CONTROLLER
26M, 27M, 28M STORAGE UNIT
26P, 27P, 28P PROCESSING UNIT
27 SENSOR CONTROLLER
28 DISPLAY CONTROLLER
28I INPUT DEVICE
29 DISPLAY UNIT
29P DISPLAY SCREEN
31 CALCULATION UNIT
32 DISPLAY PROCESSING UNIT
33 SETTING PROCESSING UNIT
34 MARKED LINE SETTING PROCESSING UNIT
35 MAGNIFICATION SETTING PROCESSING UNIT
36 COLOR CHANGE SETTING PROCESSING UNIT
37 BUBBLE CHANGE SETTING PROCESSING UNIT
40 MONITOR-DISPLAYED LEVEL
41 BUBBLE
45 DESIGN SURFACE
50, 51 COLOR SAMPLE
53a FRONT VIEW
53b SIDE VIEW
55 ENGINE
56 HYDRAULIC PUMP
57 CONTROL VALVE
58 SWING MOTOR
59 DESIGN SURFACE
61, 75, 90 ICON
70 TARGET CONSTRUCTION SURFACE
731 POINTER
73 FACING COMPASS
79 TARGET CONSTRUCTION SURFACE LINE
84 GRAPHIC INFORMATION
100 EXCAVATOR
110 MONITOR DEVICE
120L WORKING IMPLEMENT OPERATION MEMBER
130L, 130R TRAVELING OPERATION MEMBER
140 OPERATOR'S SEAT
280 DISPLAY DEVICE
300 REMOTE OPERATION ROOM
380 MOBILE TERMINAL DEVICE
B1, B2, B3 ADJUSTING BAR
B11 BOX
BX NUMERICAL VALUE INPUT BOX
BG COLOR BOX
CB1, CB11 TO CB18, CB20, CB21 CHECK BOX
CBG COLOR SETTING CHECK BOX
D LEVEL INFORMATION
E DISPLAY REGION
I1 SETTING ICON
I2 RETURN ICON
IG GUIDANCE IMAGE
L, L1, L2 MARKED LINE
CENTER
P1 TILTING POSITION
PU SETTING MENU SCREEN
PU1, PU1' MARKED LINE SETTING SCREEN
PU2 MAGNIFICATION SETTING SCREEN
PU3 COLOR CHANGE SETTING SCREEN
PU4 BUBBLE CHANGE SETTING SCREEN
r MAGNITUDE OF TILT
SL1, SL2, SL3 SLIDER
θ ANGLE
θp PITCH ANGLE
θr ROLL ANGLE

The invention claimed is:

1. A display system of a working machine, the system comprising:
a tilt sensor that detects a pitch angle and a roll angle of a working machine;
a calculation unit that calculates a tilting position on polar coordinates that indicates a magnitude and a direction of tilt of the working machine based on the detected pitch angle and roll angle;

a display unit that displays various kinds of information;
a display processing unit that displays, on a predetermined region on a display screen of the display unit, a monitor-displayed level that performs a polar coordinate display of the tilting position and a marked line indicating a preset magnitude of tilt, the monitor-displayed level including two concentric circles comprising an outer circle and an inner circle, the outer circle defining a tilt display region within which the polar coordinate of the tilting position is displayed, having a fixed size, and being displayed outside the inner circle, the inner circle being the marked line; and
a setting processing unit that performs a setting of the magnitude of the tilt of the marked line of the monitor-displayed level, wherein the inner circle is displayed on an inner side of the outer circle while a size of the inner circle is adjustable by the setting processing unit.

2. The display system of the working machine according to claim 1, wherein
the display processing unit is configured to display, on a predetermined region on a display screen of a display unit displaying various kinds of information, a monitor-displayed level and a facing compass, the monitor-displayed level performing a display of the tilting position and a marked line indicating a preset magnitude of tilt, the facing compass indicating a positional relationship between the working machine and a target construction surface selected as a target object to be worked and having an arrow-shaped pointer rotating as indicated by an arrow to a facing direction with respect to the target construction surface and to which a swinging body of the working machine is caused to swing.

3. The display system of the working machine according to claim 1, wherein the display processing unit is configured to change a color of the screen of the display when the magnitude of tilt of the tilting position exceeds the marked line.

4. The display system of the working machine according to claim 1, wherein the setting processing unit includes a color change setting processing unit that performs a setting to change a color of the screen of the display.

5. The display system of the working machine according to claim 1, wherein the tilting position is displayed as a bubble that is a circle with the tilting position as a center thereof on the screen of the display.

6. The display system of the working machine according to claim 1, wherein the tilt sensor is provided in the working machine, and at least one of the calculation unit, the display unit, the display processing unit, and the setting processing unit is provided outside the working machine.

7. A working machine comprising the display system of the working machine according to claim 1.

8. The display system of the working machine according to claim 1, wherein
the display unit is configured to display a guidance image including a target construction surface of an object to be constructed by the working machine, and
the display processing unit is configured to display, on the display unit, a display of a level indicating the tilting position calculated by the calculation unit, a gauge indicating a lateral tilt, corresponding to the roll angle, of the working machine, and a gauge indicating a longitudinal tilt, corresponding to the pitch angle, of the working machine along with the guidance image.

9. The display system of the working machine according to claim 8, wherein the display processing unit is configured to change a color of the screen of the display when the magnitude of tilt of the tilting position exceeds a marked line.

10. The display system of the working machine according to claim 8, wherein the tilting position is displayed as a bubble that is a circle with the tilting position as a center thereof on the screen of the display.

11. The display system of the working machine according to claim 8, wherein a tilt sensor is provided in the working machine, and at least one of the calculation unit, the display unit, and the display processing unit is provided outside the working machine.

12. A working machine comprising the display system of the working machine according to claim 8.

* * * * *